US012100337B2

(12) United States Patent
Liu

(10) Patent No.: US 12,100,337 B2
(45) Date of Patent: Sep. 24, 2024

(54) DRIVING CIRCUIT AND PANEL

(71) Applicant: TCL CHINA STAR OPTOELECTRONICS TECHNOLOGY CO., LTD., Shenzhen (CN)

(72) Inventor: Jinfeng Liu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/427,583

(22) PCT Filed: Jun. 3, 2021

(86) PCT No.: PCT/CN2021/098047
§ 371 (c)(1),
(2) Date: Dec. 1, 2022

(87) PCT Pub. No.: WO2022/246885
PCT Pub. Date: Dec. 1, 2022

(65) Prior Publication Data

US 2024/0038139 A1 Feb. 1, 2024

(30) Foreign Application Priority Data

May 27, 2021 (CN) ........................ 202110583233.9

(51) Int. Cl.
*G09G 3/32* (2016.01)

(52) U.S. Cl.
CPC ....... *G09G 3/32* (2013.01); *G09G 2320/0626* (2013.01)

(58) Field of Classification Search
CPC ......................... G09G 3/32; G09G 2320/0626
See application file for complete search history.

(56) References Cited

U.S. PATENT DOCUMENTS

2006/0152455 A1 7/2006 Sung
2008/0001860 A1 1/2008 Chen
2009/0027372 A1 1/2009 Shishido
(Continued)

FOREIGN PATENT DOCUMENTS

CN 1437319 A 8/2003
CN 1497523 A 5/2004
(Continued)

OTHER PUBLICATIONS

International Search Report in International application No. PCT/CN2021/098047,mailed on Jan. 26, 2022.
(Continued)

*Primary Examiner* — Muhammad N Edun
(74) *Attorney, Agent, or Firm* — PV IP PC; Wei Te Chung

(57) ABSTRACT

A driving circuit and a panel are provided. In the driving circuit, a current mirror module is configured to output different currents according to different control signals, a dimming module is connected to the current mirror module and configured to amplify the currents to generate driving currents, and a light emitting device is connected to the dimming module and correspondingly emits light with different brightness according to different driving currents.

18 Claims, 3 Drawing Sheets

(56) References Cited

U.S. PATENT DOCUMENTS

| | | | | |
|---|---|---|---|---|
| 2009/0322235 | A1* | 12/2009 | Shiu | H05B 45/10 315/307 |
| 2020/0211427 | A1* | 7/2020 | Pappas | G01R 31/2635 |
| 2022/0044643 | A1* | 2/2022 | Gu | G09G 3/32 |

FOREIGN PATENT DOCUMENTS

| | | | |
|---|---|---|---|
| CN | 1577443 | A | 2/2005 |
| CN | 1758312 | A | 4/2006 |
| CN | 1949344 | A | 4/2007 |
| CN | 101231815 | A | 7/2008 |
| CN | 102708786 | A | 10/2012 |
| CN | 102881251 | A | 1/2013 |
| CN | 103956138 | A | 7/2014 |
| CN | 111833822 | A | 10/2020 |

OTHER PUBLICATIONS

Written Opinion of the International Search Authority in International application No. PCT/CN2021/098047, mailed on Jan. 26, 2022.

Chinese Office Action issued in corresponding Chinese Patent Application No. 202110583233.9 dated Jun. 27, 2022, pp. 1-7.

* cited by examiner

DRIVING CIRCUIT AND PANEL

FIELD OF INVENTION

The present disclosure relates to the technical field of display and particularly relates to a driving circuit and a panel.

BACKGROUND OF INVENTION

Currently, Mini-LED panels and Micro-LED panels are mostly used in backlighting. Through the driving system, the panels may be finely controlled in very small partitions to achieve high-quality display effects.

In the process of research and practice of existing technologies, the inventor of the present disclosure has found that the current driving systems for Mini-LED panels and Micro-LED panels are relatively complicated, resulting in higher costs.

SUMMARY OF INVENTION

Technical Problem

An embodiment of the present disclosure provides a driving circuit and a panel, which can simplify the driving circuit and achieve an effect of saving cost.

Technical Solution

An embodiment of the present disclosure provides a driving circuit for a panel, comprising:

- a current mirror module configured to output different currents according to different control signals;
- a dimming module connected to the current mirror module and configured to amplify the currents to generate driving currents; and
- a light emitting device connected to the dimming module and correspondingly emitting light with different brightness according to different driving currents.

Optionally, in some embodiments of the present disclosure, the current mirror module includes:

- a reference current unit configured to provide a reference current; and
  - a current output control unit connected to the reference current unit and configured to output corresponding total currents according to a control signals, wherein the total currents output by the current output control unit are n times the reference current, $n \geq 1$.

Optionally, in some embodiments of the present disclosure, the current output control unit includes a plurality of current output subunits arranged in parallel and is configured to control the corresponding current output subunits to turn on or turn off according to the control signals, thereby controlling outputs of the total currents, wherein a current output by each of the current output subunits is m times the reference current, $m>0$.

Optionally, in some embodiments of the present disclosure, the reference current unit includes a first resistor and a first field-effect transistor, one end of the first resistor is input with a reference voltage, the other and of the first resistor is connected to a first end and a gate of a first filed effect diode, and a second end of the first field-effect transistor is input with a control voltage.

Optionally, in some embodiments of the present disclosure, each of the current output subunits includes a field-effect transistor and a switch element;

- in each of the current output subunits, a gate of the field-effect transistor is connected to the gate of the first filed effect diode, a first end of the field-effect transistor is connected to an input end of the switch element, and a second end of the field-effect transistor is connected the second end of the first field-effect transistor; and a control end of the switch element is input with a switch control signal, and an output end of the switch element is connected to the dimming module.

Optionally, in some embodiments of the present disclosure, the current output control unit includes a first current output subunit, a second current output subunit, and a third current output subunit;

- the first current output subunit includes a second field-effect transistor and a first switch element; the second current output subunit includes a third field-effect transistor and a second switch element; and the third current output subunit includes a fourth field-effect transistor and a third switch element;
- a first end of the second field-effect transistor is connected to an input end of the first switch element, a first end of the third field-effect transistor is connected to an input end of the second switch element, and a first end of the fourth field-effect transistor is connected an input end of the third switch element;
- gates of the second field-effect transistor, the third field-effect transistor, and the fourth field-effect transistor are connected to a gate of the first field-effect transistor; and second ends of the second field-effect transistor, the third field-effect transistor, and the fourth field-effect transistor are connected to the second end of the first field-effect transistor;
- a control end of the first switch element is input with a first switch control signal, a control end of the second switch element is input with a second switch control signal, a control end of the third switch element is input with a third switch control signal, and output ends of the first switch element, the second switch element, and the third switch element are connected to the dimming module.

Optionally, in some embodiments of the present disclosure, the dimming module includes:

- a second resistor, wherein a first end of the second resistor is connected to an output end of a current output control unit;
- a switch unit connected to a second end of the second resistor and configured to control conduction or cutoff of a current path of the dimming module; and
- an amplifying unit configured to amplify the currents output by the current mirror module to generate the driving currents for driving the light emitting device.

Optionally, in some embodiments of the present disclosure, the switch unit includes a fourth switch element and a fifth switch element, gates of the fourth switch element and the fifth switch element are input with a same scan signal, and first ends of the fourth switch element and the fifth switch element are connected to the second end of the second resistor.

Optionally, in some embodiments of the present disclosure, the amplifying unit includes a capacitor, a fifth field-effect transistor, and a sixth field-effect transistor; a first end of the capacitor is connected to a second end of the fourth switch element, a gate of the fifth field-effect transistor, and a gate of the sixth field-effect transistor; a second end of the capacitor is connected to a first end of the fifth field-effect transistor, a first end of the sixth field-effect transistor, a ground end; a second end of the fifth field-effect transistor is connected to a second end of the fifth switch element; a second end of the sixth field-effect transistor is connected to an anode of the light emitting device;

a cathode of the light emitting device is input a cathode voltage.

Optionally, in some embodiments of the present disclosure, the amplifying unit includes an amplification factor k, the total current output by the current output control unit is $I_{data}$, and the driving current output by the amplifying unit is $k \times I_{data}$, $5 \leq k \leq 15$.

The present disclosure relates to a panel comprising a driving circuit, wherein the driving circuit comprises:

a current mirror module configured to output different currents according to different control signals;

a dimming module connected to the current mirror module and configured to amplify the currents to generate driving currents; and a light emitting device connected to the dimming module and correspondingly emitting light with different brightness according to different driving currents;

the panel further comprises a light emitting substrate and a driving chip electrically connected to the light emitting substrate, the current mirror module is integrated on the driving chip, and the dimming module is arranged on a display substrate.

Optionally, in some embodiments of the present disclosure, the panel is a display panel or a backlight panel.

Optionally, in some embodiments of the present disclosure, the current mirror module includes:

a reference current unit configured to provide a reference current; and a current output control unit connected to the reference current unit and configured to output corresponding total currents according to the control signals, wherein the total currents output by the current output control unit are n times the reference current, n≥1.

Optionally, in some embodiments of the present disclosure, the current output control unit includes a plurality of current output subunits arranged in parallel and is configured to control the corresponding current output subunits to turn on or turn off according to the control signals, thereby controlling outputs of the total currents, wherein a current output by each of the current output subunits is m times the reference current, m>0.

Optionally, in some embodiments of the present disclosure, the reference current unit includes a first resistor and a first field-effect transistor, one end of the first resistor is input with a reference voltage, the other and of the first resistor is connected to a first end and a gate of the first filed effect diode, and a second end of the first field-effect transistor is input with a control voltage.

Optionally, in some embodiments of the present disclosure, each of the current output subunits includes a field-effect transistor and a switch element;

in each of the current output subunits, a gate of the field-effect transistor is connected to the gate of the first filed effect diode, a first end of the field-effect transistor is connected to an input end of the switch element, and a second end of the field-effect transistor is connected the second end of the first field-effect transistor; and a control end of the switch element is input with a switch control signal, and an output end of the switch element is connected to the dimming module.

Optionally, in some embodiments of the present disclosure, the current output control unit includes a first current output subunit, a second current output subunit, and a third current output subunit;

the first current output subunit incudes a second field-effect transistor and a first switch element; the second current output subunit includes a third field-effect transistor and a second switch element; and the third current output subunit includes a fourth field-effect transistor and a third switch element;

a first end of the second field-effect transistor is connected to an input end of the first switch element, a first end of the third field-effect transistor is connected to an input end of the second switch element, and a first end of the fourth field-effect transistor is connected an input end of the third switch element;

gates of the second field-effect transistor, the third field-effect transistor, and the fourth field-effect transistor are connected to a gate of the first field-effect transistor; and second ends of the second field-effect transistor, the third field-effect transistor, and the fourth field-effect transistor are connected to the second end of the first field-effect transistor; and a control end of the first switch element is input with a first switch control signal, a control end of the second switch element is input with a second switch control signal, a control end of the third switch element is input with a third switch control signal, and output ends of the first switch element, the second switch element, and the third switch element are connected to the dimming module.

Optionally, in some embodiments of the present disclosure, the dimming module includes:

a second resistor, wherein a first end of the second resistor is connected to an output end of a current output control unit;

a switch unit connected to a second end of the second resistor and configured to control conduction or cutoff of a current path of the dimming module; and an amplifying unit configured to amplify the currents output by the current mirror module to generate the driving currents for driving the light emitting device.

Optionally, in some embodiments of the present disclosure, the switch unit includes a fourth switch element and a fifth switch element, gates of the fourth switch element and the fifth switch element are input with a same scan signal, and first ends of the fourth switch element and the fifth switch element are connected to the second end of the second resistor.

Optionally, in some embodiments of the present disclosure, the amplifying unit includes a capacitor, a fifth field-effect transistor, and a sixth field-effect transistor; a first end of the capacitor is connected to a second end of the fourth switch element, a gate of the fifth field-effect transistor, and a gate of the sixth field-effect transistor; a second end of the capacitor is connected to a first end of the fifth field-effect transistor, a first end of the sixth field-effect transistor, a ground end; a second end of the fifth field-effect transistor is connected to a second end of the fifth switch element; a second end of the sixth field-effect transistor is connected to an anode of the light emitting device;

a cathode of the light emitting device is input a cathode voltage.

Optionally, in some embodiments of the present disclosure, Optionally, in some embodiments of the present disclosure, the amplifying unit includes an amplification factor k, the total current output by the current output control unit is $I_{data}$, and the driving current output by the amplifying unit is $k \times I_{data}$, $5 \leq k \leq 15$.

BENEFICIAL EFFECTS

In the embodiment of the present disclosure, the current mirror module may be controlled to output different currents according to the control signals, and then the output currents are amplified by the dimming module to drive the light emitting device. The current mirror module may output different currents, so that the light emitting device emits the light with different brightness. The dimming module amplifies the output current of the current mirror module, so that the light emitting device works normally and may reduce the load of the current mirror module.

DESCRIPTION OF DRAWINGS

To describe the technical solutions more clearly in the embodiments of the present disclosure, the following will briefly introduce the drawings that need to be used in the description of the embodiments. Obviously, the drawings in the following description are only some embodiments of the present disclosure, and for those skilled in the art, other drawings can be obtained based on these drawings without creative work.

DETAILED DESCRIPTION OF PREFERRED EMBODIMENTS

Figure 1:
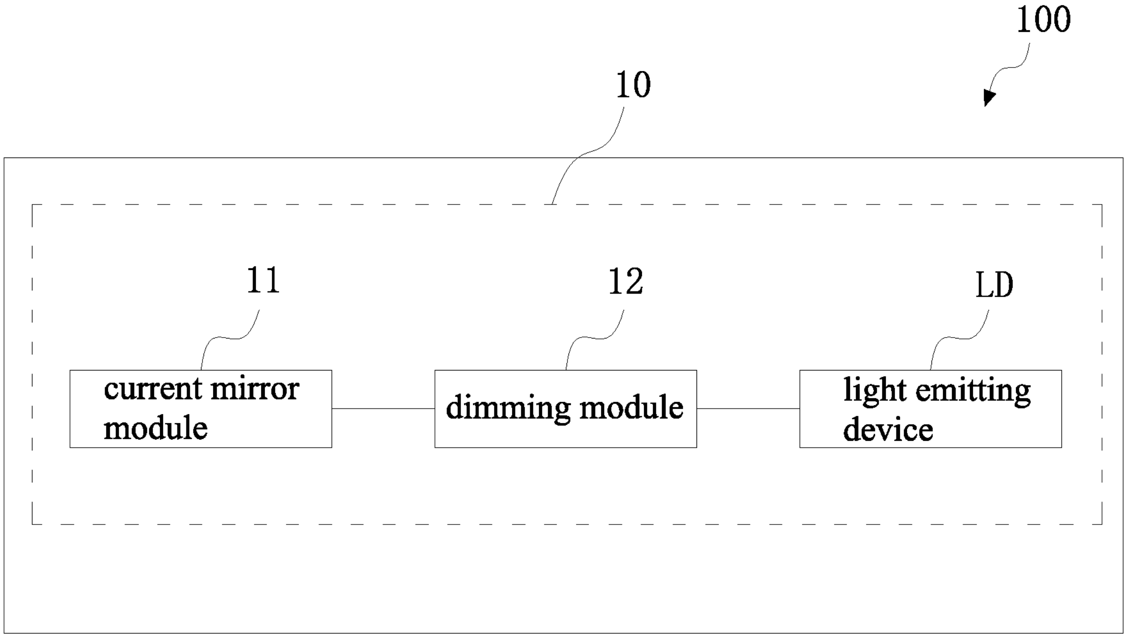
FIG. 1 is a schematic structural diagram of a driving circuit according to an embodiment of the present disclosure.

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments in the present disclosure, all other embodiments obtained by those skilled in the art without creative work shall fall within the protection scope of the present disclosure. Furthermore, it should be understood that the specific implementations described here are only used to illustrate and explain the present disclosure and not used to limit the present disclosure. In this present disclosure, unless otherwise stated, the directional words used such as "upper" and "lower" generally refer to the upper and lower directions of the device in actual use or working state, and specifically refer to the drawing directions in the drawings, and "inner" and "outer" refer to the outline of the device.

The embodiment of the present disclosure provides a driving circuit and a panel, which will be described in detail below.

Figure 2:
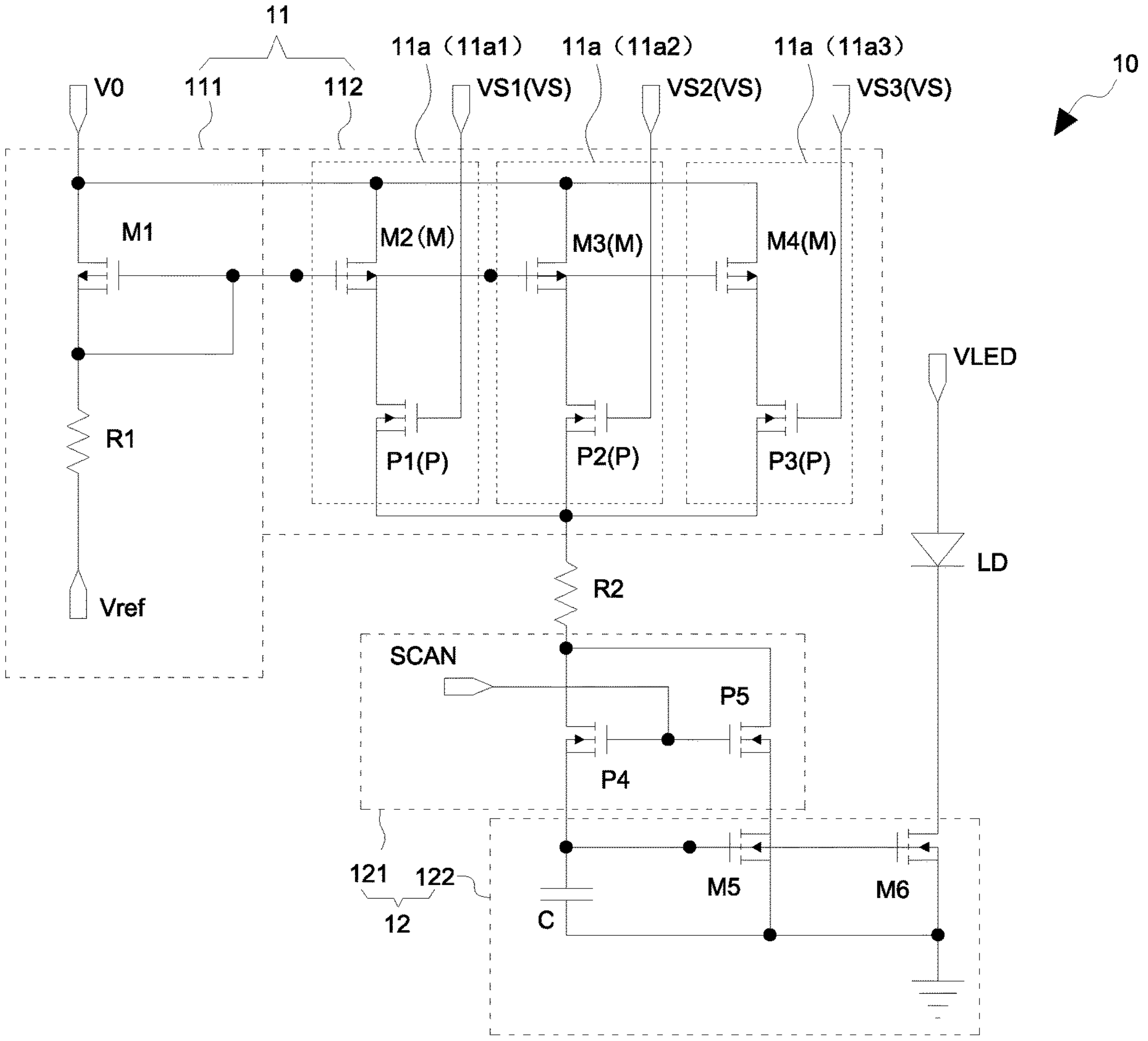
FIG. 2 is a circuit diagram of the driving circuit according to an embodiment of the present disclosure.

Refer to FIG. 1 and FIG. 2. The embodiment of the present disclosure provides a driving circuit 10 for a panel 100. The driving circuit 10 comprises a current mirror module 11, a dimming module 12, and a light emitting device LD.

The current mirror module 11 is configured to output different currents according to different control signals.

The dimming module 12 is connected to the current mirror module 11. The dimming module 12 is configured to amplify the currents to generate driving currents.

The light emitting device LD is connected to the dimming module 12. The light emitting device LD correspondingly emits light with different brightness according to different driving currents.

In the embodiment of the present disclosure, the current mirror module 11 may be controlled to output different currents according to the control signals, then the output currents are amplified by the dimming module 12 to drive the light emitting device LD. The current mirror module 11 may output different currents, so that the light emitting device LD emits the light with different brightness. The dimming module 12 amplifies the output current of the current mirror module 11, so that the light emitting device LD works normally and may reduce the load of the current mirror module 11.

Optionally, the control signal may be one of a viewing angle mode signal, a video source signal, and a brightness signal, or other control signals.

Optionally, the light emitting device LD may be one of an OLED light emitting device, a mini-LED light emitting device, and a micro-LED light emitting device. In this embodiment, a mini-LED light emitting device is taken as an example of the light emitting device LD for description but is not limited to this.

Optionally, the current mirror module 11 includes a reference current unit 111 and a current output control unit 112. The reference current unit 111 is configured to provide a reference current.

The current output control unit 112 is connected to the reference current unit 111. The current output control unit 112 is configured to output corresponding total currents according to the control signals, wherein the total currents output by the current output control unit 112 are n times the reference current, $n \geq 1$.

For example, the first brightness of the light emitting device LD corresponds to 1 time the reference current, the second brightness of the light emitting device LD corresponds to 2 times the reference current, and the third brightness of the light emitting device LD corresponds to 3 times the reference current, that is, the nth brightness of the light emitting device LD corresponds to n times the reference current. When the light emitting device LD is required to emit the nth brightness, the total current output by the current output control unit 112 is controlled to be n times the reference current.

The brightness of the light of the light emitting device LD may also correspond to a non-integer multiple of the reference current, and the specific corresponding relationship may be adjusted according to the actual situation, which will not be repeated here.

Optionally, the current output control unit 112 includes a plurality of current output subunits 11*a* arranged in parallel. The current output control unit 112 is configured to control the corresponding current output subunits to turn on or turn off according to the control signals, thereby controlling outputs of the total currents, wherein a current output by each of the current output subunits 11*a* is m times the reference current, $m>0$.

In other words, the total current output by the current output control unit 112 is the sum of the currents actually output by the current output subunits 11*a*.

For example, this embodiment needs to realize that the light emitting device LD may switch between 8 different kinds of brightness. Three current output subunits 11*a* may be set. The current output by the first current output subunit is 1 time of the reference current, the output current of the second current output subunit is twice the reference current, and the output current of the third current output subunit is 4 times the reference current. Therefore, the total current output by the current output control unit 112 has 8 optional total output currents: 0, 1, 2, 1+2, 4, 2+3, 2+4, and 1+2+4 times the reference current.

The 8 different total currents correspond to the 8 different kinds of brightness of the light-emitting device LD. Therefore, if the embodiment requires the light emitting device LD to have more different brightness. The number of current output subunits 11*a* may be increased accordingly. For example, if the light emitting device LD is required to have 16 different kinds of brightness, a current output subunit 11*a* with 8 times the reference current output in parallel may be added based on the above example.

It can be understood that the current output by the current output subunit 11*a* may also be a non-integer multiple of the reference current, such as ½, ¾, 3/2, 9/4, 18/5, and so on.

Optionally, the reference current unit 111 includes a first resistor R1 and a first field-effect transistor M1. One end of the first resistor R1 is input with a reference voltage Vref, the other and of the first resistor R1 is connected to a first end and a gate of the first filed effect diode M1, and a second end of the first field-effect transistor M1 is input with a control voltage.

Each of the current output subunits 11*a* includes a field-effect transistor M and a switch element P.

In each of the current output subunits 11*a*, a gate of the field-effect transistor M is connected to the gate of the first filed effect diode M1, a first end of the field-effect transistor M is connected to an input end of the switch element P, and a second end of the field-effect transistor M is connected the second end of the first field-effect transistor M1. A control end of the switch element P is input with a switch control signal VS, and an output end of the switch element P is connected to the dimming module 12.

When the switch control signal VS is at a high level, the switch element P is turned on. When the switch control signal VS is at a low level, the switch element P is turned off. It may also be that when the switch control signal VS is at a low level, the switch element P is turned on. When the switch control signal VS is at a high level, the switch element P is turned off.

Optionally, the field-effect transistor M may be an N-type field-effect transistor or a P-type field-effect transistor. The switch element P may be a field-effect transistor or a triode.

Optionally, each of the current output subunits 11*a* may determine different output currents of the current output subunits 11*a* by selecting field-effect transistors with different channel width to length ratios.

Optionally, the current output control unit 112 includes a first current output subunit 11*a*1, a second current output subunit 11*a*2, and a third current output subunit 11*a*3.

The first current output subunit 11*a*1 includes a second field-effect transistor M2 and a first switch element P1. The second current output subunit 11*a*2 includes a third field-effect transistor M3 and a second switch element P2. The third current output subunit 11*a*3 includes a fourth field-effect transistor M4 and a third switch element P3.

A first end of the second field-effect transistor M2 is connected to an input end of the first switch element P1. A first end of the third field-effect transistor M3 is connected to an input end of the second switch element P2. A first end of the fourth field-effect transistor M4 is connected an input end of the third switch element P3.

Gates of the second field-effect transistor M2, the third field-effect transistor M3, and the fourth field-effect transistor M4 are connected to a gate of the first field-effect transistor M1. Second ends of the second field-effect transistor M2, the third field-effect transistor M3, and the fourth field-effect transistor M4 are connected to the second end of the first field-effect transistor M1.

A control end of the first switch element P1 is input with a first switch control signal VS1. A control end of the second switch element P2 is input with a second switch control signal VS2. A control end of the third switch element P3 is input with a third switch control signal VS3. Output ends of the first switch element P1, the second switch element P2, and the third switch element P3 are connected to the dimming module 12.

In the embodiment, the current output control unit 112 includes three current output subunits 11*a* as an example for description but is not limited to this.

Optionally, the dimming module 12 includes a second resistor R2, a switch unit 121, and an amplifying unit 122.

A first end of the second resistor R2 is connected to an output end of the current output control unit 112.

The switch unit 121 is connected to a second end of the second resistor R2. The switch unit 121 is configured to control conduction or cutoff of a current path of the dimming module 12.

The amplifying unit 122 is configured to amplify the currents output by the current mirror module 11 to generate the driving currents for driving the light emitting device LD.

By providing the amplifying unit 122, the load of the current mirror module 11 may be reduced. The current mirror module 11 may output a smaller current. Under the action of the amplifying unit 122, the light emitting device LD may be driven to work normally.

Optionally, the switch unit 121 includes a fourth switch element P4 and a fifth switch element P5. Gates of the fourth switch element P4 and the fifth switch element P5 are input with a same scan signal SCAN, and first ends of the fourth switch element P4 and the fifth switch element P5 are connected to the second end of the second resistor R2.

In the embodiment, the same scan signal SCAN is used to simultaneously control the fourth switch element P4 and the fifth switch element P5 to be on or off at the same time.

Optionally, the amplifying unit 112 includes a capacitor C, a fifth field-effect transistor M5, and a sixth field-effect transistor M6. A first end of the capacitor C is connected to a second end of the fourth switch element P4, a gate of the fifth field-effect transistor M5, and a gate of the sixth field-effect transistor M6. A second end of the capacitor C is connected to a first end of the fifth field-effect transistor M5, a first end of the sixth field-effect transistor M6, and a ground end. A second end of the fifth field-effect transistor M5 is connected to a second end of the fifth switch element P5. A second end of the sixth field-effect transistor M6 is connected to an anode of the light emitting device LD. A cathode of the light emitting device LD is input a cathode voltage VLED.

Optionally, the amplifying unit 122 includes an amplification factor k, the total current output by the current output control unit 112 is $I_{data}$, and the driving current output by the amplifying unit 122 is $k \times I_{data}$, $5 \le k \le 15$.

For example, k may be 5, 6, 7, 8, 9, 10, 11, 12, 13, 14, and 15.

The value of k is selected by channel modulation of the fifth field-effect transistor M5 and the sixth field-effect transistor M6. That is, selecting different channel width to length ratios of field-effect transistors results in different k values.

Figure 3:
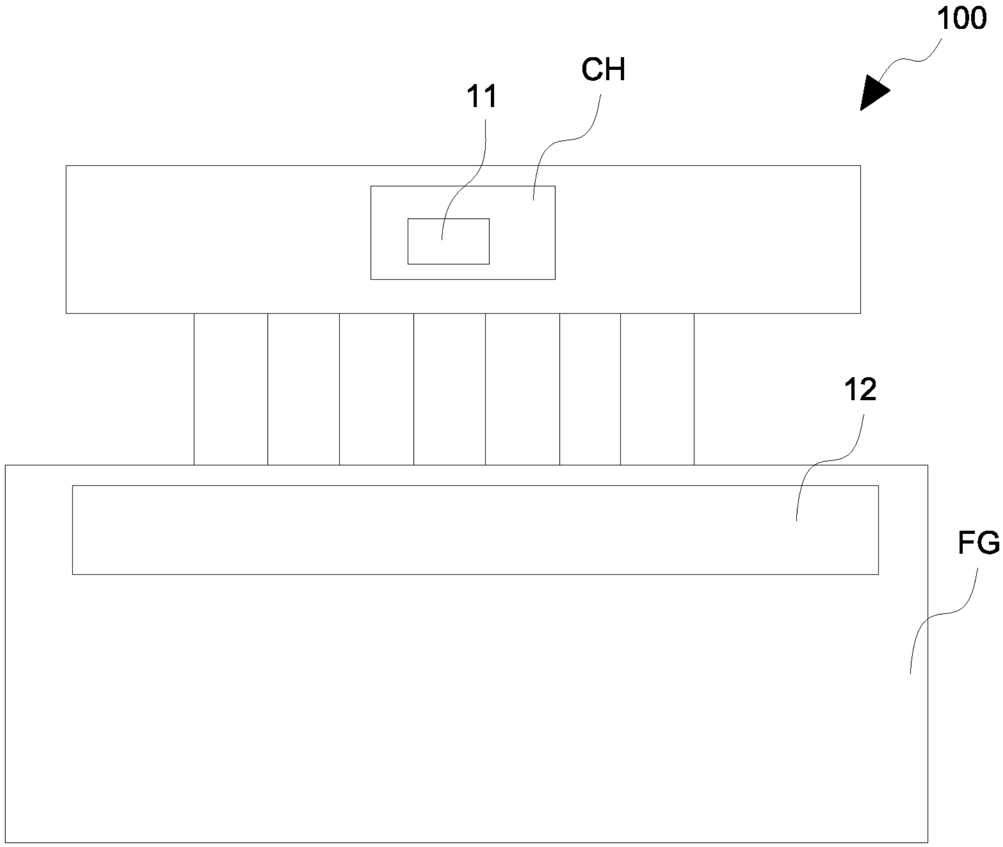
FIG. 3 is a schematic diagram of a panel according to an embodiment of the present disclosure.

Refer to FIG. 3. The present disclosure also provides a panel 100. The panel 100 comprises a light emitting substrate FG and a driving chip CH electrically connected to the light emitting substrate FG. The current mirror module 11 is integrated onto the driving chip CH. The dimming module 12 is arranged on the light emitting substrate FG.

Since the current mirror module 11 is integrated onto the driving chip CH, the load of the driving chip CH may be reduced by disposing the dimming module 12.

Optionally, the panel 100 is a display panel or a backlight panel.

In the embodiment of the present disclosure, the current mirror module 11 may be controlled to output different currents according to the control signals, then the output currents are amplified by the dimming module 12 to drive the light emitting device LD. The current mirror module 11 may output different currents, so that the light emitting device LD emits the light with different brightness. The dimming module 12 amplifies the output current of the current mirror module 11, so that the light emitting device LD works normally and may reduce the load of the current mirror module 11.

The above is a detailed introduction to the driving circuit of a panel provided by the embodiment of the present disclosure, and specific examples are used in this article to illustrate the principle and implementation of the present disclosure. The description of the above embodiment is only used to help understand the method and core idea of the present disclosure. At the same time, for those skilled in the art, according to the idea of the present disclosure, there will be changes in the specific implementation and the scope of present disclosure. In summary, the content of this specification should not be construed as a limitation to the present disclosure.

What is claimed is:

1. A driving circuit for a panel, comprising:

a current mirror sub-circuit configured to output different currents according to different control signals;

a dimming sub-circuit connected to the current mirror sub-circuit and configured to amplify the currents to generate a driving current; and a light emitting device connected to the dimming sub-circuit and configured to emit light with a brightness based on the driving current, wherein the current mirror sub-circuit comprises:

a reference current unit configured to provide a reference current; and a current output control unit connected to the reference current unit and configured to output the currents based on the control signals, wherein the currents are n times the reference current, where n≥1.

2. The driving circuit according to claim 1, wherein the current output control unit comprises a plurality of current output subunits connected in parallel and is configured to turn on or turn off the current output subunits based on the control signals to output the currents, and each of the current output subunits is configured to output a current being m times the reference current, where m>0.

3. The driving circuit according to claim 2, wherein the reference current unit comprises a first resistor and a first field-effect transistor, a terminal of the first resistor is input with a reference voltage, an other terminal of the first resistor is connected to a first terminal and a gate of the first field-effect transistor, and a second terminal of the first field-effect transistor is input with a control voltage.

4. The driving circuit according to claim 3, wherein each of the current output subunits comprises a second field-effect transistor and a first switch element;

a gate of the second field-effect transistor is connected to the gate of the first field-effect diode, a first terminal of the second field-effect transistor is connected to an input terminal of the first switch element, and a second terminal of the second field-effect transistor is connected the second terminal of the first field-effect transistor; and a control terminal of the first switch element is input with a switch control signal, and an output terminal of the first switch element is connected to the dimming sub-circuit.

5. The driving circuit according to claim 4, wherein the current output subunits comprise three current output sub-units.

6. The driving circuit according to claim 1, wherein the dimming sub-circuit comprises:

a second resistor having a first terminal connected to an output terminal of the current output control unit;

a switch unit connected to a second terminal of the second resistor and configured to switch on or switch off a current path of the dimming sub-circuit; and an amplifier unit configured to amplify the currents to generate the driving current.

7. The driving circuit according to claim 6, wherein the switch unit comprises a second switch element and a third switch element, respective gates of the second switch element and the third switch element are input with a same scan signal, and respective first terminals of the second switch element and the third switch element are connected to the second terminal of the second resistor.

8. The driving circuit according to claim 7, wherein the amplifier unit comprises a capacitor, a third field-effect transistor, and a fourth field-effect transistor;

a first terminal of the capacitor is connected to a second terminal of the second switch element, a gate of the third field-effect transistor, and a gate of the fourth field-effect transistor;

a second terminal of the capacitor is connected to a first terminal of the third field-effect transistor, a first terminal of the fourth field-effect transistor, and a ground terminal;

a second terminal of the third field-effect transistor is connected to a second terminal of the third switch element;

a second terminal of the fourth field-effect transistor is connected to an anode of the light emitting device; and a cathode of the light emitting device is input with a cathode voltage.

9. The driving circuit according to claim 6, wherein the amplifier unit has an amplifier factor k, the currents are $I_{data}$, and the driving current is $k \times I_{data}$, where $5 \leq k \leq 15$.

10. A panel comprising a driving circuit, wherein the driving circuit comprises:

a current mirror sub-circuit configured to output different currents according to different control signals;

a dimming sub-circuit connected to the current mirror sub-circuit and configured to amplify the currents to generate a driving current; and a light emitting device connected to the dimming sub-circuit and configured to emit light with a brightness based on the driving current;

wherein the panel further comprises a light emitting substrate and a driving chip electrically connected to the light emitting substrate, the current mirror sub-circuit is integrated on the driving chip, and the dimming sub-circuit is disposed on the light emitting substrate, wherein the current mirror sub-circuit comprises:

a reference current unit configured to provide a reference current; and a current output control unit connected to the reference current unit and configured to output the currents based on the control signals, wherein the currents are n times the reference current, where n≥1.

11. The panel according to claim 10, wherein the panel is a display panel or a backlight panel.

12. The panel according to claim 10, wherein the current output control unit comprises a plurality of current output subunits connected in parallel and is configured to turn on or turn off the current output subunits based on the control signals to output the currents, and each of the current output subunits is configured to output a current being m times the reference current, where m>0.

13. The panel according to claim 12, wherein the reference current unit comprises a first resistor and a first field-effect transistor, a terminal of the first resistor is input with a reference voltage, an other terminal of the first resistor is connected to a first terminal and a gate of the first field-effect transistor, and a second terminal of the first field-effect transistor is input with a control voltage.

14. The panel according to claim 13, wherein each of the current output subunits comprises a second field-effect transistor and a first switch element;

a gate of the second field-effect transistor is connected to the gate of the first field-effect diode, a first terminal of the second field-effect transistor is connected to an input terminal of the first switch element, and a second terminal of the second field-effect transistor is connected the second terminal of the first field-effect transistor; and a control terminal of the first switch element is input with a switch control signal, and an output terminal of the first switch element is connected to the dimming sub-circuit.

15. The panel according to claim 14, wherein the current output subunits comprise three current output subunits.

16. The panel according to claim 10, wherein the dimming sub-circuit comprises:

a second resistor having a first terminal connected to an output terminal of the current output control unit;

a switch unit connected to a second terminal of the second resistor and configured to switch on or switch off a current path of the dimming sub-circuit; and an amplifier unit configured to amplify the currents to generate the driving current.

17. The panel according to claim 16, wherein the switch part comprises a second switch element and a third switch element, respective gates of the second switch element and the third switch element are input with a same scan signal, and respective first terminals of the second switch element and the third switch element are connected to the second terminal of the second resistor.

18. The panel according to claim 17, wherein the amplifier unit comprises a capacitor, a third field-effect transistor, and a fourth field-effect transistor;

a first terminal of the capacitor is connected to a second terminal of the second switch element, a gate of the third field-effect transistor, and a gate of the fourth field-effect transistor;

a second terminal of the capacitor is connected to a first terminal of the third field-effect transistor, a first terminal of the fourth field-effect transistor, and a ground terminal;

a second terminal of the third field-effect transistor is connected to a second terminal of the third switch element;

a second terminal of the fourth field-effect transistor is connected to an anode of the light emitting device; and a cathode of the light emitting device is input with a cathode voltage.

* * * * *